United States Patent [19]

Kluge et al.

[11] 4,077,275
[45] Mar. 7, 1978

[54] GEARSHIFT LEVER ASSEMBLY

[75] Inventors: Erwin Kluge, Wolfsburg; Burckhardt Becker, Solingen-Widdert, both of Germany

[73] Assignee: Volkswagenwerk Aktiengesellschaft, Germany

[21] Appl. No.: 697,691

[22] Filed: Jun. 18, 1976

[30] Foreign Application Priority Data

Jul. 10, 1975 Germany ............................ 2530802

[51] Int. Cl.² ............................................ G05G 9/12
[52] U.S. Cl. .................................. 74/473 R; 74/491; 267/153; 267/161; 403/132
[58] Field of Search ................. 74/473 R, 475, 473 P, 74/476, 477, 491, 523; 267/153, 161; 137/DIG. 4; 403/132, 133, 138

[56] References Cited

U.S. PATENT DOCUMENTS

| 420,155 | 1/1890 | Hageman | 137/DIG. 4 |
| 957,347 | 5/1910 | Kennedy | 137/DIG. 4 |
| 1,899,332 | 2/1933 | Jeffries | 74/476 |
| 2,893,665 | 7/1959 | Paulsen | 267/153 X |
| 3,410,150 | 11/1968 | Wieland et al. | 74/476 |
| 3,493,221 | 2/1970 | Mozdzanowski | 267/153 |
| 3,901,495 | 8/1975 | Suzuki | 267/153 |

Primary Examiner—Allan D. Herrmann
Attorney, Agent, or Firm—Brumbaugh, Graves, Donohue & Raymond

[57] ABSTRACT

A gearshift lever assembly provides vibration isolation between the gearshift lever and its associated housing and additionally provides elastic restoring forces in opposition to movement of the gearshift lever into one of its shift positions. In the preferred embodiment the gearshift lever is supported by a member made from elastic material which surrounds the gearshift lever and is assembled with permanent pretensioning in a direction opposite to the movement of the lever into one of its shift positions.

4 Claims, 3 Drawing Figures

GEARSHIFT LEVER ASSEMBLY

BACKGROUND OF THE INVENTION

This invention relates to gearshift lever assemblies and particularly to such assemblies which provide elastic forces in opposition to movement of the shift into one of its shift positions.

Prior gearshift lever support assemblies which incorporate elastic forces opposing movement of the shift lever into one of its shift positions have been provided with metallic spiral springs associated with the shift lever. In shifting arrangements which include movement of the shift lever along its axis such springs produce forces opposite to the direction of movement of the lever along its axis. This arrangement is often used to facilitate distinction between forward and reverse gears since movement of the shift lever into the reverse gear positions requires a movement of the lever along its axis in opposition to the forces of the spring. Such springs have also been used in other shift lever arrangements wherein the driver may distinguish different shift positions according to the magnitude of forces required for the shifting motion.

In a gearshift lever assembly, particularly one to be used in an automobile, it is desirable to prevent transmission of noise caused by vibration in the engine and gears, into the vehicle interior. Such noise transmission is particularly pronounced whenever parts in direct connection with the engine or gears, such as the gearshift lever, are also vibrationally coupled to elements, such as the gearshift housing, which may transmit such vibrations to the vehicle interior. Prior published German Patent Application No. 1,935,824 discloses an arrangement for preventing the transmission of such vibrations to the vehicle interior, which is usable in a gearshift lever assembly wherein the lever is mounted to a gearshift housing at its midpoint. This prior arrangement makes use of a vibration absorbing packing element positioned between the gearshift lever support and the transmission housing. This arrangement is not suitable for use in assemblies wherein the gearshift lever is connected to the housing at one end and coupled to the transmission at its midsection. In addition this prior arrangement does not supply the desired spring force without the use of vibration transmitting metallic springs.

It is therefore an object of the present invention to provide a new and improved gearshift apparatus having reduced noise transmission and simplified construction.

It is a further object of the present invention to provide such a gearshift apparatus which provides elastic restoring forces in opposition to movement of the gearshift lever onto one of its shift positions.

SUMMARY OF THE INVENTION

In accordance with the present invention there is provided a gearshift apparatus which includes a housing, a gearshift lever arranged partially within the housing and a support, interconnecting the lever and the housing. The support includes a member made from elastic material surrounding the lever and assembled with permanent pretensioning in a direction opposite to the movement of said lever into one of its shift positions and providing elastic restoring forces in opposition to such movements.

In a preferred embodiment the elastic support member has a nonlinear force versus deformation characteristic with a relatively flat segment. The member is assembled with a pretensioning such that movement into one of the shift positions corresponds to the flat segment of the force characteristic. In an embodiment usable in a shifting configuration which includes movement of the shift lever along its axis, the support member is in the shape of a plate of elastic material and is maintained in a frame around its outer edge to assume an arched configuration in its relaxed state. The central portion of the plate has an opening for accommodating the lever which is tapered toward opposite surfaces of the plate and bears against a collar on the lever to produce the pretensioning.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
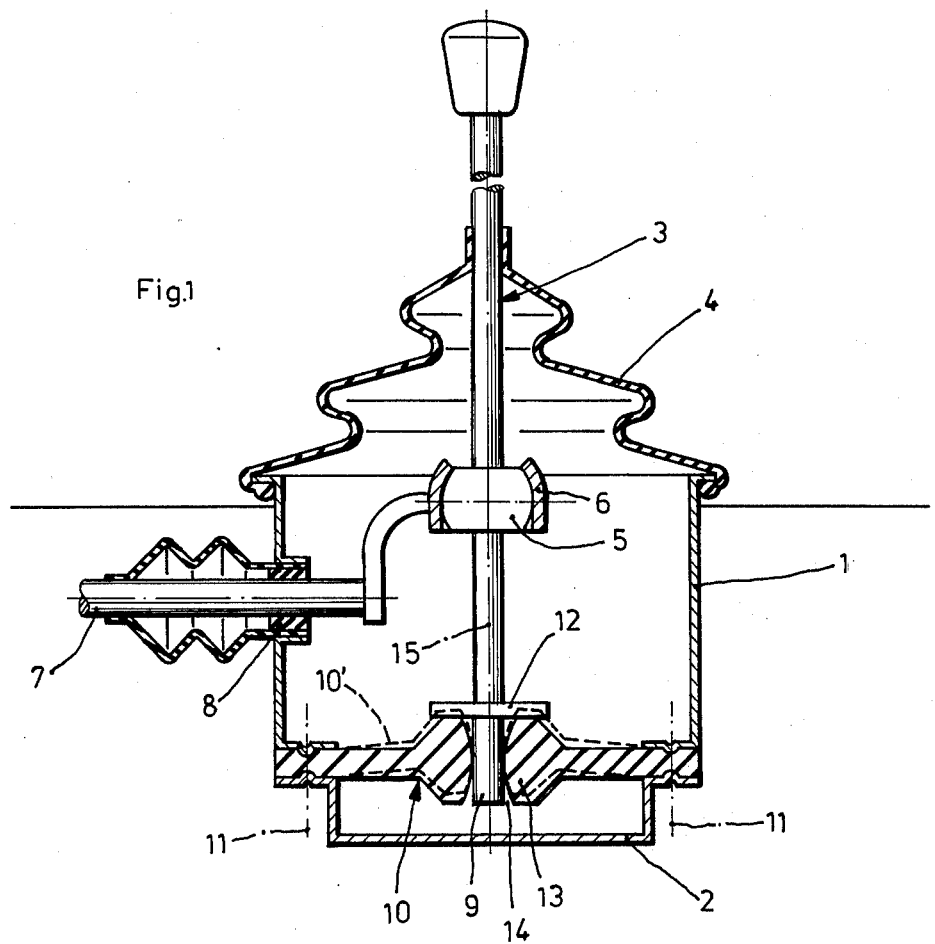
FIG. 1 is a cross sectional view of a gearshift lever assembly in accordance with the present invention.

FIG. 1 is a cross sectional view of a gearshift lever assembly in accordance with the present invention. The FIG. 1 apparatus is designed to accommodate shifting in an arrangement which includes movement of the shift lever 3 along its axis 15 in order to shift into at least one of the gears, for example reverse gear. The apparatus of FIG. 1 includes a gearshift housing 1 having at one end a cover 2. Gearshift lever 3 protrudes from the opposite end and is surrounded by protective boot 4. A spherical section 5 of gearshift lever 3 is mounted within a receiving member 6, which is coupled to a gearshift rod 7. Gearshift rod 7 extends through the wall of housing 1 by an opening 8, which includes vibration insulation material. The opposite end of rod 7, which is not shown, is coupled to the transmission of the vehicle.

A support member 10, which is in the form of a plate, is made of elastic material, such as rubber. The plate is mounted in a frame formed by cover 2 and housing 1, which are fastened by screws positioned around the edges of cover 2 at 11. The central portion of plate 10 has opening 14 which is tapered from a smaller diameter near its center toward a larger diameter at the opposite surfaces of the plate. The tapered opening provides working contact between plate 10 and end 9 of gearshift lever 3 in a plane approximately perpendicular to axis 15. This contact remains at approximately the same level at all positions of lever 3. The central portion 13 of plate 10 is rendered thicker than the remaining portions and interacts with collar 12 on gearshift lever 3. The lower end 9 of gearshift lever 3 extends through the tapered opening 14 in plate 10.

The relaxed shape of plate 10, prior to insertion of gearshift lever 3, is illustrated by dotted lines 10'. In this relaxed shape plate 10 has an arched radial cross section. When lever 3 is mounted in the position shown, collar 12 forces plate 10 into a generally flat configuration as illustrated by the solid lines, thereby causing plate 10 to have a permanent pretensioning in opposition to movement of shift lever 3 in a downward direction along its axis 15.

Figure 2:
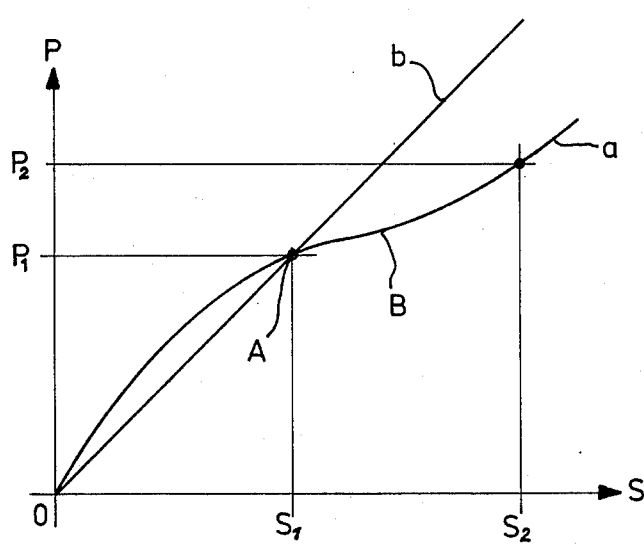
FIG. 2 is a graph of force versus deformation.

The effect of the pretensioning of plate 10 in the embodiment of FIG. 1 is illustrated by the force versus deformation diagram of FIG. 2. In FIG. 2 force is designated by P and deformation designated by S. Prior art metallic spring gearshift arrangements have a linear force versus deformation curve which is illustrated as $b$. The elastic plate 10 illustrated in FIG. 1 has the nonlinear force versus deformation curve illustrated as $a$ in FIG. 2. Curve $a$ includes a relatively flat segment B over which there is small variation of the forces associated with deformation. In a preferred embodiment of the invention plate 10 is displaced by collar 12 to a position of deformation indicated by $S_1$. When lever 3 is moved along its axis 15 in a downward direction, for example to shift into reverse gear, plate 10 is deformed from position $S_1$ to $S_2$. This deformation is over the relatively flat segment of curve $a$ during which the elastic forces vary between $P_1$ and $P_2$. The force required by the operator during this shifting movement is therefore relatively constant, which results in a smooth action of the shifting mechanism and a lower maximum shifting force than would result using a metallic spring in accordance with the prior art.

Figure 3:
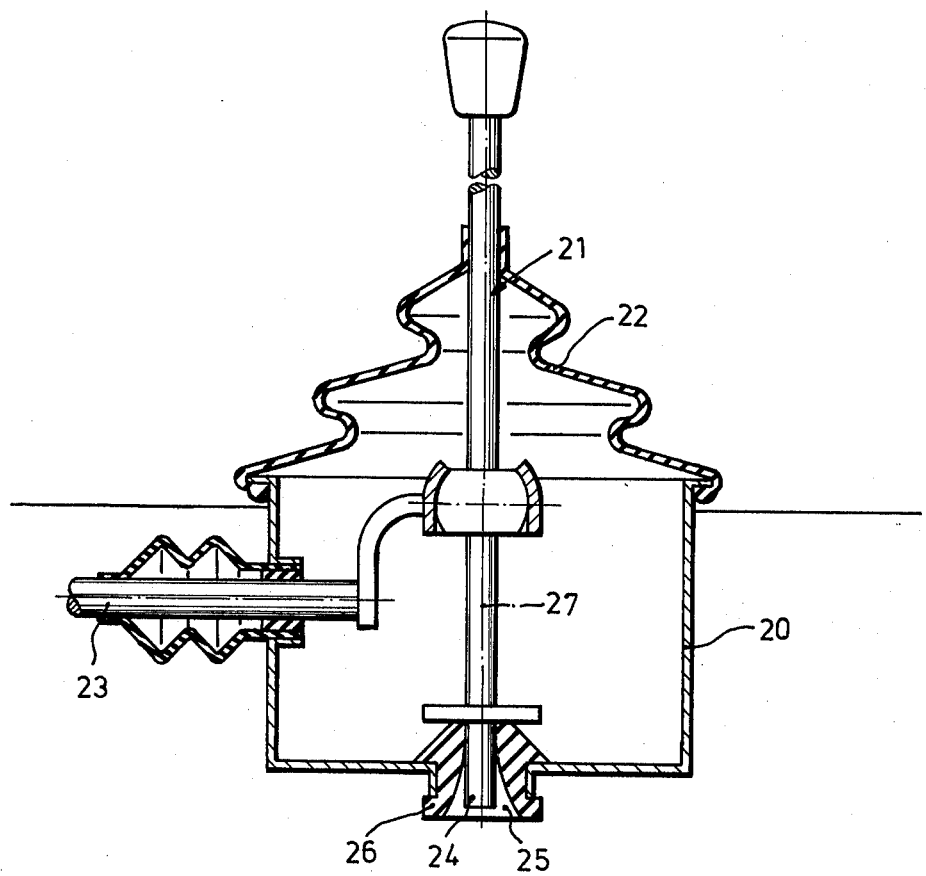
FIG. 3 is a cross sectional view of another gearshift lever assembly in accordance with the present invention.

FIG. 3 is a cross sectional view of an alternate gearshift lever assembly in accordance with the present invention. The FIG. 3 embodiment is usable in a gearshift arrangement which includes only movements of gearshift lever 21 which are transverse to the axis 27 of lever 21. The assembly includes housing 20, boot 22, and shift rod 23 which are similar to the corresponding elements of the FIG. 1 embodiment. A support member 26 made from rubber surrounds the lower portion 24 of gearshift lever 21 and is mounted with a pretensioning in a direction which is transverse to axis 27 of lever 21. The opening 25 in support member 26 is conically tapered in one direction only so that the transverse pretensioning when lever 21 is in its central position is on the upper portion of support member 26.

The pretensioning of support member 26 provides elastic forces in opposition to transverse movements of shift lever 21 into its shift positions. The pretension forces act transverse to axis 27 and support 26 can be dimensioned and pretensioned so that relatively large forces must be overcome for shifting into one of the shift positions, such as reverse.

While there have been described what are believed to be the preferred embodiments of the present invention, those skilled in the art will recognize that other and further modifications may be had thereto without departing from the true spirit of the invention, and it is intended to cover all such embodiments which fall within the true scope of the invention.

We claim:

1. A gearshift lever assembly comprising a housing, a gearshift lever having an axis and arranged partially within said housing, and a support interconnecting said lever and said housing and providing support for said lever in directions transverse to said axis, said support comprising a member made from rubberlike material surrounding said lever and assembled with permanent pretensioning in a direction opposite to the movement of said lever into one of its shift positions, and providing elastic restoring forces in opposition to such movement.

2. A gearshift lever assembly as specified in claim 1 wherein said rubberlike support member has a nonlinear force versus deformation characteristic, having a relatively flat segment, and is assembled with pretensioning such that movement into one of the shift positions corresponds to said relatively flat segment.

3. A gearshift lever assembly as specified in claim 1, usable in a shifting configuration wherein there is shifting movement along the axis of said lever, wherein said rubberlike support member comprises a plate of rubberlike material, maintained in a frame around its outer edge and assuming an arched configuration in its relaxed state, the central portion of said plate surrounding said lever and bearing against a collar on said lever, said collar bearing against the center of said plate in opposition to the arch configuration, thereby producing said pretensioning.

4. A gearshift apparatus as specified in claim 3 wherein said plate has a central opening surrounding said lever which is tapered from the center towards the openings on opposite surfaces of the plate, having the smallest cross section near the center.

* * * * *